US010313418B2

(12) United States Patent
Lau

(10) Patent No.: US 10,313,418 B2
(45) Date of Patent: Jun. 4, 2019

(54) CHUNKED HTTP VIDEO CACHE ROUTING

(71) Applicant: Ramp Holdings, Inc., Boston, MA (US)

(72) Inventor: Raymond Lau, Charlestown, MA (US)

(73) Assignee: Ramp Holdings, Inc., Boston, MA (US)

( * ) Notice: Subject to any disclaimer, the term of this patent is extended or adjusted under 35 U.S.C. 154(b) by 279 days.

(21) Appl. No.: 15/186,596

(22) Filed: Jun. 20, 2016

(65) Prior Publication Data

US 2017/0366593 A1 Dec. 21, 2017

(51) Int. Cl.

*H04L 29/06* (2006.01)
*H04L 29/12* (2006.01)
*H04L 29/08* (2006.01)

(52) U.S. Cl.

CPC ........ *H04L 65/605* (2013.01); *H04L 63/0428* (2013.01); *H04L 65/4084* (2013.01); *H04L 65/608* (2013.01); *H04L 67/2842* (2013.01); *H04L 61/1511* (2013.01); *H04L 63/168* (2013.01); *H04L 67/02* (2013.01)

(58) Field of Classification Search

CPC ............................ H04L 65/605; H04L 67/02; H04L 67/2857; H04L 65/4084; H04L 65/608; H04L 63/0428; H04L 67/10; H04L 61/1511

See application file for complete search history.

(56) References Cited

U.S. PATENT DOCUMENTS

2001/0025309 A1* 9/2001 Macleod ............ G06F 17/2765 709/223
2007/0050522 A1* 3/2007 Grove .............. H04L 29/12018 709/246
2013/0097309 A1* 4/2013 Ma .................. H04L 29/08099 709/224
2013/0132504 A1* 5/2013 Kohli ..................... G06F 15/16 709/213
2013/0275557 A1* 10/2013 Myers ............... H04N 21/2221 709/219
2015/0120821 A1* 4/2015 Bendell .................. H04L 67/02 709/203
2016/0014439 A1* 1/2016 Friedrich ......... H04N 21/23439 725/92
2016/0073392 A1* 3/2016 Byun ................ H04W 72/048 370/280
2016/0142428 A1* 5/2016 Pastore ............... H04L 63/1466 726/23
2017/0041422 A1* 2/2017 Westphal ............ H04L 67/2847
2017/0171287 A1* 6/2017 Famaey ................. H04L 67/02

* cited by examiner

*Primary Examiner* — Abdullahi E Salad
(74) *Attorney, Agent, or Firm* — Adler Pollock & Sheehan P.C.; Daniel J Holmander, Esq.

(57) ABSTRACT

Methods and apparatus, including computer program products, for chunked Hypertext Transfer Protocol (HTTP) video cache routing. A method includes, in a client system linked to at least one arbitrary cache node and a group of interconnected computers that include one or more local cache nodes, the client system including at least a processor and a memory, the memory including a browser, loading a player in the browser, and on the player, playing chunked HTTP video requested from the one arbitrary cache node acting as a master cache node, the master cache node requesting a manifest and modifying the manifest so the requests for the actual video are retrieved by the client system from one of the local cache nodes.

16 Claims, 8 Drawing Sheets

100

Loading a video player into a browser, the browser running in a memory of a user system
110

Loading, in the video player, a URI of a chunked HTTP video
120

Consulting, in the browser, a PAC file, seeing that the URI matches a domain serving video, and making a request to a master cache node as specified by the PAC file
130

Loading, in the browser, MPD from the master cache node
140

Loading, in the master cache node, MPD from the Internet
150

Modifying, in the master cache node, the manifest to point to the appropriate local cache node depending on the browser's IP address, and returning it to the player in the browser
160

Parsing, in the player, the manifest and making subsequent requests for media chunks to the re-written URIs, which now point to a local cache node acting as a reverse proxy
170

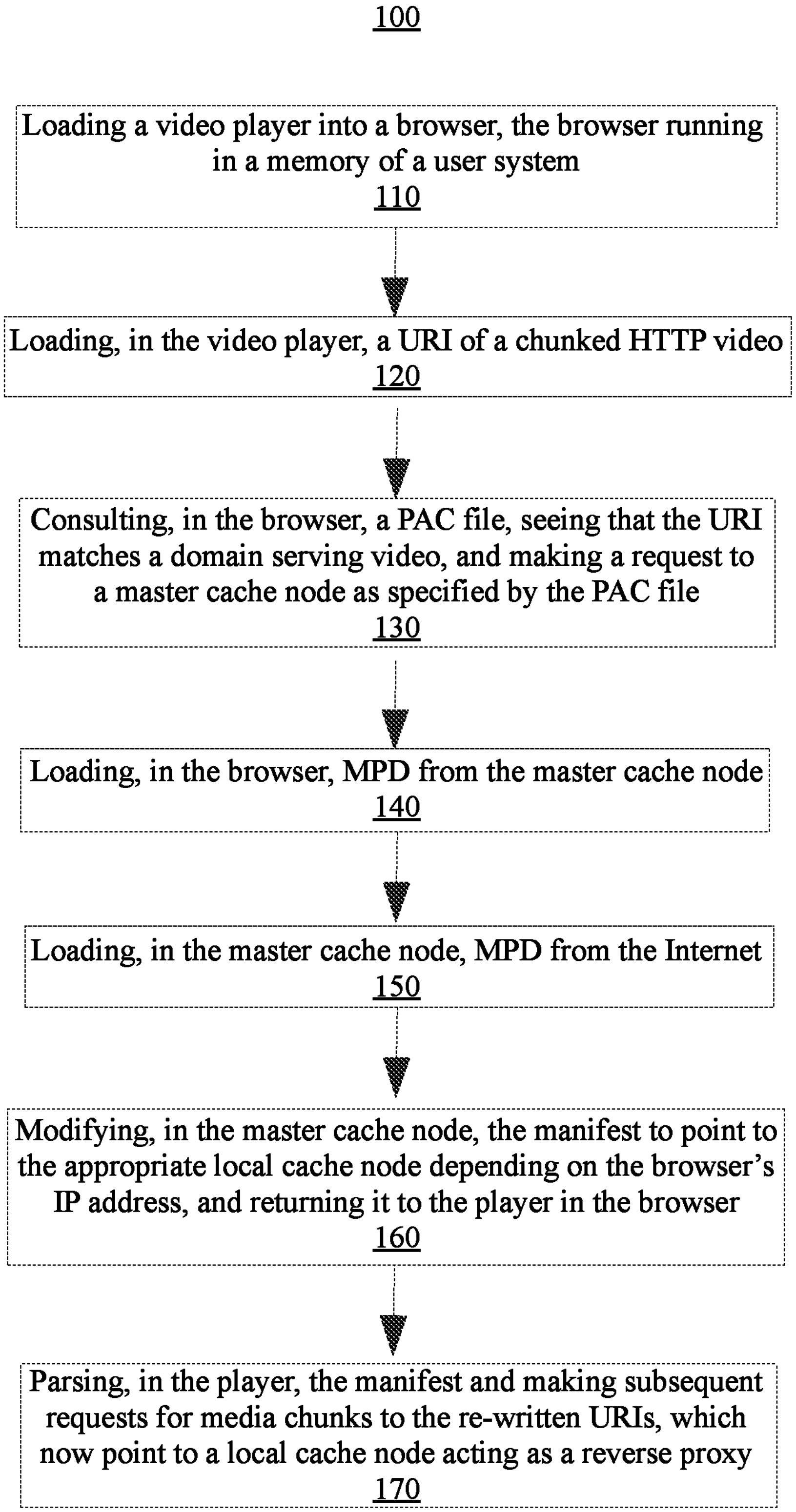

FIG. 2

```
#EXTM3U
#EXT-X-STREAM-INF:PROGRAM-
ID=1,BANDWIDTH=2149280,CODECS="mp4a.40.2,avc1.64001f",RESOLUTION=1280x720,NAME="720"
url_0/193039199_mp4_h264_aac_hd_7.m3u8
#EXT-X-STREAM-INF:PROGRAM-
ID=1,BANDWIDTH=2149280,CODECS="mp4a.40.2,avc1.64001f",RESOLUTION=1280x720,NAME="720"
url_1/193039199_mp4_h264_aac_hd_7.m3u8
#EXT-X-STREAM-INF:PROGRAM-
ID=1,BANDWIDTH=246440,CODECS="mp4a.40.5,avc1.42000d",RESOLUTION=320x184,NAME="240"
url_2/193039199_mp4_h264_aac_ld_7.m3u8
#EXT-X-STREAM-INF:PROGRAM-
ID=1,BANDWIDTH=246440,CODECS="mp4a.40.5,avc1.42000d",RESOLUTION=320x184,NAME="240"
url_3/193039199_mp4_h264_aac_ld_7.m3u8
#EXT-X-STREAM-INF:PROGRAM-
ID=1,BANDWIDTH=460560,CODECS="mp4a.40.5,avc1.420016",RESOLUTION=512x288,NAME="380"
url_4/193039199_mp4_h264_aac_7.m3u8
#EXT-X-STREAM-INF:PROGRAM-
ID=1,BANDWIDTH=460560,CODECS="mp4a.40.5,avc1.420016",RESOLUTION=512x288,NAME="380"
url_5/193039199_mp4_h264_aac_7.m3u8
#EXT-X-STREAM-INF:PROGRAM-
ID=1,BANDWIDTH=836280,CODECS="mp4a.40.2,avc1.64001f",RESOLUTION=848x480,NAME="480"
url_6/193039199_mp4_h264_aac_hq_7.m3u8
#EXT-X-STREAM-INF:PROGRAM-
ID=1,BANDWIDTH=836280,CODECS="mp4a.40.2,avc1.64001f",RESOLUTION=848x480,NAME="480"
url_7/193039199_mp4_h264_aac_hq_7.m3u8
#EXT-X-STREAM-INF:PROGRAM-
ID=1,BANDWIDTH=6221600,CODECS="mp4a.40.2,avc1.640028",RESOLUTION=1920x1080,NAME="1080"
url_8/193039199_mp4_h264_aac_fhd_7.m3u8
#EXT-X-STREAM-INF:PROGRAM-
ID=1,BANDWIDTH=6221600,CODECS="mp4a.40.2,avc1.640028",RESOLUTION=1920x1080,NAME="1080"
url_9/193039199_mp4_h264_aac_fhd_7.m3u8
```

FIG. 3A

```
#EXTM3U
#EXT-X-STREAM-INF:PROGRAM-
ID=1,BANDWIDTH=2149280,CODECS="mp4a.40.2,avc1.64001f",RESOLUTION=1280x720,NAME="720"
http://rlau-omnicache:11080/omnicacheroute/http/www.streambox.fr/playlists/x36xhzz/url_0/193039199_mp4_h264_aac_hd_7.m3u8
#EXT-X-STREAM-INF:PROGRAM-
ID=1,BANDWIDTH=2149280,CODECS="mp4a.40.2,avc1.64001f",RESOLUTION=1280x720,NAME="720"
http://rlau-omnicache:11080/omnicacheroute/http/www.streambox.fr/playlists/x36xhzz/url_1/193039199_mp4_h264_aac_hd_7.m3u8
#EXT-X-STREAM-INF:PROGRAM-
ID=1,BANDWIDTH=246440,CODECS="mp4a.40.5,avc1.42000d",RESOLUTION=320x184,NAME="240"
http://rlau-omnicache:11080/omnicacheroute/http/www.streambox.fr/playlists/x36xhzz/url_2/193039199_mp4_h264_aac_ld_7.m3u8
#EXT-X-STREAM-INF:PROGRAM-
ID=1,BANDWIDTH=246440,CODECS="mp4a.40.5,avc1.42000d",RESOLUTION=320x184,NAME="240"
http://rlau-omnicache:11080/omnicacheroute/http/www.streambox.fr/playlists/x36xhzz/url_3/193039199_mp4_h264_aac_ld_7.m3u8
#EXT-X-STREAM-INF:PROGRAM-
ID=1,BANDWIDTH=460560,CODECS="mp4a.40.5,avc1.420016",RESOLUTION=512x288,NAME="380"
http://rlau-omnicache:11080/omnicacheroute/http/www.streambox.fr/playlists/x36xhzz/url_4/193039199_mp4_h264_aac_7.m3u8
#EXT-X-STREAM-INF:PROGRAM-
ID=1,BANDWIDTH=460560,CODECS="mp4a.40.5,avc1.420016",RESOLUTION=512x288,NAME="380"
http://rlau-omnicache:11080/omnicacheroute/http/www.streambox.fr/playlists/x36xhzz/url_5/193039199_mp4_h264_aac_7.m3u8
#EXT-X-STREAM-INF:PROGRAM-
ID=1,BANDWIDTH=836280,CODECS="mp4a.40.2,avc1.64001f",RESOLUTION=848x480,NAME="480"
http://rlau-omnicache:11080/omnicacheroute/http/www.streambox.fr/playlists/x36xhzz/url_6/193039199_mp4_h264_aac_hq_7.m3u8
#EXT-X-STREAM-INF:PROGRAM-
ID=1,BANDWIDTH=836280,CODECS="mp4a.40.2,avc1.64001f",RESOLUTION=848x480,NAME="480"
http://rlau-omnicache:11080/omnicacheroute/http/www.streambox.fr/playlists/x36xhzz/url_7/193039199_mp4_h264_aac_hq_7.m3u8
#EXT-X-STREAM-INF:PROGRAM-
ID=1,BANDWIDTH=6221600,CODECS="mp4a.40.2,avc1.640028",RESOLUTION=1920x1080,NAME="1080"
http://rlau-omnicache:11080/omnicacheroute/http/www.streambox.fr/playlists/x36xhzz/url_8/193039199_mp4_h264_aac_fhd_7.m3u8
#EXT-X-STREAM-INF:PROGRAM-
ID=1,BANDWIDTH=6221600,CODECS="mp4a.40.2,avc1.640028",RESOLUTION=1920x1080,NAME="1080"
http://rlau-omnicache:11080/omnicacheroute/http/www.streambox.fr/playlists/x36xhzz/url_9/193039199_mp4_h264_aac_fhd_7.m3u8
```

FIG. 3B

```
<?xml version="1.0" encoding="utf-8"?>
<manifest xmlns="http://ns.adobe.com/f4m/1.0">
	<id>live.smil</id>
	<width>1280</width>
	<height>720</height>
	<mimeType>video/mp4</mimeType>
	<streamType>live</streamType>
	<deliveryType>streaming</deliveryType>
	<bootstrapInfo id="bootstrap1500000" profile="named" url="playlist_b1500000.abst"/>
	<media bootstrapInfoId="bootstrap1500000" width="1280" height="720" bitrate="1464" url="media_b1500000.abst/">

<metadata>AgAKb25NZXRhRGF0YQMACXRyYWNraW5mbwoAAAABAwAEdHlwZQIABWF1ZGlvAAI0aW1lc2NhbGUAQOdwAAAAAAAABm
NvbmZpZw1ABDExOTAAC2Rlc2NyaXB0aW9uAgBXe0FBQ0ZyYW1lOiBjb2RlYzpBQUMsIGNoYW5uZWxzOjIsIGZyZXF1ZW5jeTo0ODAwMCwg
c2FtcGxlc1BlckZyYW1lOjEwMjQsIG9iamVjdFR5cGU6TEN9ABFzYW1wbGVkZXNjcmlwdGlvbgoAAAABAwAKc2FtcGxldHlwZQIABGF2YzEAA
AkAAAkADWF1ZGlvY2hhbm5lbHMAQAAAAAAAAAAAAD2F1ZGlvc2FtcGxlcmF0ZQBA53AAAAAAAAAMYXVkaW9jb2RlY2lkAgAEbXA0YQ
ANYXVkaW9kYXRhcmF0ZQBAV0AAAAAAAAAKdHJhbnNjb2RlcgMACmF1ZGlvQ29kZWMCAANBQUMADGF1ZGlvQml0cmF0ZQBA93AAA
AAAAAATYXVkaW9FbmNvZGluZ1BhcmFtcwEAAAp2aWRlb0NvZGVjAgAESDI2NAAMdmlkZW9CaXRyYXRlAEEz1iAAAAAAAABN2aWRlb0lt
cGxlbWVudGF0aW9uAgAHREVGQVVMVAAMdmlkZW9Qcm9maWxlAgAETUFJTgAVdmlkZW9GcmFtZVNpemVGaXRNb2RlAgAKZml0LWhla
WdodAATdmlkZW9GcmFtZVNpemVXaWR0aABAiAAAAAAAAAAAAUdmlkZW9GcmFtZVNpemVIZWlnaHQAQIaAAAAAAAAAAGXZpZGVvS2V5
RnJhbWVGb2xsb3dTb3VyY2UBAAAVdmlkZW9LZXlGcmFtZUludGVydmFsAEBOAAAAAAAAABN2aWRlb0VuY29kaW5nUGFyYW1zAQAAAA
kAAAk=</metadata>
	</media>
	<bootstrapInfo id="bootstrap900000" profile="named" url="playlist_b900000.abst"/>
	<media bootstrapInfoId="bootstrap900000" width="640" height="360" bitrate="878" url="media_b900000.abst/">

<metadata>AgAKb25NZXRhRGF0YQMACXRyYWNraW5mbwoAAAABAwAEdHlwZQIABWF1ZGlvAAI0aW1lc2NhbGUAQOdwAAAAAAAABm
NvbmZpZw1ABDExOTAAC2Rlc2NyaXB0aW9uAgBXe0FBQ0ZyYW1lOiBjb2RlYzpBQUMsIGNoYW5uZWxzOjIsIGZyZXF1ZW5jeTo0ODAwMCwg
c2FtcGxlc1BlckZyYW1lOjEwMjQsIG9iamVjdFR5cGU6TEN9ABFzYW1wbGVkZXNjcmlwdGlvbgoAAAABAwAKc2FtcGxldHlwZQIABGF2YzEAA
AkAAAkADWF1ZGlvY2hhbm5lbHMAQAAAAAAAAAAAAD2F1ZGlvc2FtcGxlcmF0ZQBA53AAAAAAAAAMYXVkaW9jb2RlY2lkAgAEbXA0YQ
ANYXVkaW9kYXRhcmF0ZQBAV0AAAAAAAAAKdHJhbnNjb2RlcgMACmF1ZGlvQ29kZWMCAANBQUMADGF1ZGlvQml0cmF0ZQBA93AAA
AAAAAATYXVkaW9FbmNvZGluZ1BhcmFtcwEAAAp2aWRlb0NvZGVjAgAESDI2NAAMdmlkZW9CaXRyYXRlAEEp8KAAAAAAAABN2aWRlb0l
tcGxlbWVudGF0aW9uAgAHREVGQVVMVAAMdmlkZW9Qcm9maWxlAgAETUFJTgAVdmlkZW9GcmFtZVNpemVGaXRNb2RlAgAKZml0LWhla
WdodAATdmlkZW9GcmFtZVNpemVXaWR0aABAhAAAAAAAAAAAAUdmlkZW9GcmFtZVNpemVIZWlnaHQAQHaAAAAAAAAAAGXZpZGVvS2V
5RnJhbWVGb2xsb3dTb3VyY2UBAAAVdmlkZW9LZXlGcmFtZUludGVydmFsAEBOAAAAAAAAAABN2aWRlb0VuY29kaW5nUGFyYW1zAQAAA
AkAAAk=</metadata>
	</media>
	<bootstrapInfo id="bootstrap600000" profile="named" url="playlist_b600000.abst"/>
	<media bootstrapInfoId="bootstrap600000" width="284" height="160" bitrate="585" url="media_b600000.abst/">

<metadata>AgAKb25NZXRhRGF0YQMACXRyYWNraW5mbwoAAAABAwAEdHlwZQIABWF1ZGlvAAI0aW1lc2NhbGUAQOdwAAAAAAAABm
NvbmZpZw1ABDExOTAAC2Rlc2NyaXB0aW9uAgBXe0FBQ0ZyYW1lOiBjb2RlYzpBQUMsIGNoYW5uZWxzOjIsIGZyZXF1ZW5jeTo0ODAwMCwg
c2FtcGxlc1BlckZyYW1lOjEwMjQsIG9iamVjdFR5cGU6TEN9ABFzYW1wbGVkZXNjcmlwdGlvbgoAAAABAwAKc2FtcGxldHlwZQIABGF2YzEAA
AkAAAkADWF1ZGlvY2hhbm5lbHMAQAAAAAAAAAAAAD2F1ZGlvc2FtcGxlcmF0ZQBA53AAAAAAAAAMYXVkaW9jb2RlY2lkAgAEbXA0YQ
ANYXVkaW9kYXRhcmF0ZQBAV0AAAAAAAAAKdHJhbnNjb2RlcgMACmF1ZGlvQ29kZWMCAANBQUMADGF1ZGlvQml0cmF0ZQBA93AAA
AAAAAATYXVkaW9FbmNvZGluZ1BhcmFtcwEAAAp2aWRlb0NvZGVjAgAESDI2NAAMdmlkZW9CaXRyYXRlAEEJagAAAAAAABN2aWRlb0lt
cGxlbWVudGF0aW9uAgAHREVGQVVMVAAMdmlkZW9Qcm9maWxlAgAIQkFTRUxJTkUAFXZpZGVvRnJhbWVTaXplRml0TW9kZQIACmZpdC
1oZWlnaHQAE3ZpZGVvRnJhbWVTaXplV2lkdGgAQHHAAAAAAAAAFHZpZGVvRnJhbWVTaXplSGVpZ2h0AEBkAAAAAAAAABl2aWRlb0tleU
ZyYW1lRm9sbG93U291cmNlAQAAFXZpZGVvS2V5RnJhbWVJbnRlcnZhbABATgAAAAAAAAATdmlkZW9FbmNvZGluZ1BhcmFtcwEAAAAJAA
AJ</metadata>
	</media>
</manifest>
```

FIG. 4A

```
<?xml version="1.0" encoding="UTF-8"?><manifest xmlns="http://ns.adobe.com/f4m/1.0">
    <id>live.smil</id>
    <width>1280</width>
    <height>720</height>
    <mimeType>video/mp4</mimeType>
    <streamType>live</streamType>
    <deliveryType>streaming</deliveryType>
    <bootstrapInfo id="bootstrap1500000" profile="named" url="playlist_b1500000.abst"/>
    <media bitrate="1464" bootstrapInfoId="bootstrap1500000" height="720" url="media_b1500000.abst/" width="1280">

<metadata>AgAKb25NZXRhRGF0YQMACXRyYWNraW5mbwoAAAABAwAEdHlwZQIABWF1ZGlvAAl0aW1lc2NhbGUAQOdw
AAAAAAAABmNvbmZpZwIABDExOTAAC2Rlc2NyaXB0aW9uAgBXe0FBQ0ZyYW1lOiBjb2RlYzpBQUMsIGNoYW5uZWxzOjIs
IGZyZXF1ZW5jeTo0ODAwMCwgc2FtcGxlc1BlckZyYW1lOjEwMjQsIG9iamVjdFR5cGU6TEN9ABFzYW1wbGVkZXNjcmlwdGlvb
goAAAABAwAKc2FtcGxldHlwZQIABGF2YzEAAAkAAAkADWF1ZGlvY2hhbm5lbHMAQAAAAAAAAAAAAD2F1ZGlvc2FtcGxlc
mF0ZQBA53AAAAAAAAAMYXVkaW9jb2RlY2lkAgAEbXA0YQANYXVkaW9kYXRhcmF0ZQBAV0AAAAAAAAAKdHJhbnNjb
2RlcgMACmF1ZGlvQ29kZWMCAANBQUMADGF1ZGlvQml0cmF0ZQBA93AAAAAAAAATYXVkaW9FbmNvZGluZ1BhcmFtcw
EAAAp2aWRlb0NvZGVjAgAESDI2NAAMdmlkZW9CaXRyYXRlAEEz1iAAAAAAABN2aWRlb0ltcGxlbWVudGF0aW9uAgAHRE
VGQVVMVAAMdmlkZW9Qcm9maWxlAgAETUFJTgAVdmlkZW9GcmFtZVNpemVGaXRNb2RlAgAKZml0LWhlaWdodAATdmlkZ
W9GcmFtZVNpemVXaWR0aABAlAAAAAAAAAAUdmlkZW9GcmFtZVNpemVIZWlnaHQAQIaAAAAAAAAAGXZpZGVvS2V5
RnJhbWVGb2xsb3dTb3VyY2UBAAAVdmlkZW9LZXlGcmFtZUludGVydmFsAEBOAAAAAAAAABN2aWRlb0VuY29kaW5nUGFy
YW1zAQAAAAkAAAk=</metadata>
    </media>
    <bootstrapInfo id="bootstrap900000" profile="named" url="playlist_b900000.abst"/>
    <media bitrate="878" bootstrapInfoId="bootstrap900000" height="360" url="media_b900000.abst/" width="640">

<metadata>AgAKb25NZXRhRGF0YQMACXRyYWNraW5mbwoAAAABAwAEdHlwZQIABWF1ZGlvAAl0aW1lc2NhbGUAQOdw
AAAAAAAABmNvbmZpZwIABDExOTAAC2Rlc2NyaXB0aW9uAgBXe0FBQ0ZyYW1lOiBjb2RlYzpBQUMsIGNoYW5uZWxzOjIs
IGZyZXF1ZW5jeTo0ODAwMCwgc2FtcGxlc1BlckZyYW1lOjEwMjQsIG9iamVjdFR5cGU6TEN9ABFzYW1wbGVkZXNjcmlwdGlvb
goAAAABAwAKc2FtcGxldHlwZQIABGF2YzEAAAkAAAkADWF1ZGlvY2hhbm5lbHMAQAAAAAAAAAAAAD2F1ZGlvc2FtcGxlc
mF0ZQBA53AAAAAAAAAMYXVkaW9jb2RlY2lkAgAEbXA0YQANYXVkaW9kYXRhcmF0ZQBAV0AAAAAAAAAKdHJhbnNjb
2RlcgMACmF1ZGlvQ29kZWMCAANBQUMADGF1ZGlvQml0cmF0ZQBA93AAAAAAAAATYXVkaW9FbmNvZGluZ1BhcmFtcw
EAAAp2aWRlb0NvZGVjAgAESDI2NAAMdmlkZW9CaXRyYXRlAEEp8KAAAAAAABN2aWRlb0ltcGxlbWVudGF0aW9uAgAHR
EVGQVVMVAAMdmlkZW9Qcm9maWxlAgAETUFJTgAVdmlkZW9GcmFtZVNpemVGaXRNb2RlAgAKZml0LWhlaWdodAATdmlk
ZW9GcmFtZVNpemVXaWR0aABAhAAAAAAAAAAUdmlkZW9GcmFtZVNpemVIZWlnaHQAQHaAAAAAAAAAGXZpZGVvS2
V5RnJhbWVGb2xsb3dTb3VyY2UBAAAVdmlkZW9LZXlGcmFtZUludGVydmFsAEBOAAAAAAAAABN2aWRlb0VuY29kaW5nUG
FyYW1zAQAAAAkAAAk=</metadata>
    </media>
    <bootstrapInfo id="bootstrap600000" profile="named" url="playlist_b600000.abst"/>
    <media bitrate="585" bootstrapInfoId="bootstrap600000" height="160" url="media_b600000.abst/" width="284">

<metadata>AgAKb25NZXRhRGF0YQMACXRyYWNraW5mbwoAAAABAwAEdHlwZQIABWF1ZGlvAAl0aW1lc2NhbGUAQOdw
AAAAAAAABmNvbmZpZwIABDExOTAAC2Rlc2NyaXB0aW9uAgBXe0FBQ0ZyYW1lOiBjb2RlYzpBQUMsIGNoYW5uZWxzOjIs
IGZyZXF1ZW5jeTo0ODAwMCwgc2FtcGxlc1BlckZyYW1lOjEwMjQsIG9iamVjdFR5cGU6TEN9ABFzYW1wbGVkZXNjcmlwdGlvb
goAAAABAwAKc2FtcGxldHlwZQIABGF2YzEAAAkAAAkADWF1ZGlvY2hhbm5lbHMAQAAAAAAAAAAAAD2F1ZGlvc2FtcGxlc
mF0ZQBA53AAAAAAAAAMYXVkaW9jb2RlY2lkAgAEbXA0YQANYXVkaW9kYXRhcmF0ZQBAV0AAAAAAAAAKdHJhbnNjb
2RlcgMACmF1ZGlvQ29kZWMCAANBQUMADGF1ZGlvQml0cmF0ZQBA93AAAAAAAAATYXVkaW9FbmNvZGluZ1BhcmFtcw
EAAAp2aWRlb0NvZGVjAgAESDI2NAAMdmlkZW9CaXRyYXRlAEEIagAAAAAAABN2aWRlb0ltcGxlbWVudGF0aW9uAgAHRE
VGQVVMVAAMdmlkZW9Qcm9maWxlAgAIQkFTRUxJTkUAFXZpZGVvRnJhbWVTaXplRml0TW9kZQIACmZpdC1oZWlnaHQA
E3ZpZGVvRnJhbWVTaXplV2lkdGgAQHHAAAAAAAAAFHZpZGVvRnJhbWVTaXplSGVpZ2h0AEBkAAAAAAAAABl2aWRlb0tl
eUZyYW1lRm9sbG93U291cmNlAQAAFXZpZGVvS2V5RnJhbWVJbnRlcnZhbABATgAAAAAAAAATdmlkZW9FbmNvZGluZ1Bhc
mFtcwEAAAAJAAAJ</metadata>
    </media>
<baseURL>http://rlau-omnicache:11080/omnicacheroute/http/192.168.54.111:1935/dash/smil:live.smil/</baseURL>
</manifest>
```

FIG. 4B

```
<?xml version="1.0" encoding="UTF-8"?>
<MPD xmlns:xsi="http://www.w3.org/2001/XMLSchema-instance"
     xmlns="urn:mpeg:dash:schema:mpd:2011"
     xmlns:xlink="http://www.w3.org/1999/xlink"
     xsi:schemaLocation="urn:mpeg:DASH:schema:MPD:2011
http://standards.iso.org/ittf/PubliclyAvailableStandards/MPEG-DASH_schema_files/DASH-
MPD.xsd"
     profiles="urn:mpeg:dash:profile:isoff-live:2011"
     type="dynamic"
     minimumUpdatePeriod="PT7.77S"
     publishTime="2016-06-15T01:47:34Z"
     availabilityStartTime="2016-06-14T12:29:57Z"
     timeShiftBufferDepth="PT52.0S"
     suggestedPresentationDelay="PT15.0S"
     minBufferTime="PT6.0S">
<ProgramInformation>
    <Title>live.smil</Title>
</ProgramInformation>
<Period id="0" start="PT0.0S">
    <AdaptationSet id="0" mimeType="video/mp4" maxWidth="1280" maxHeight="720" par="16:9"
frameRate="15" segmentAlignment="true" startWithSAP="1" subsegmentAlignment="true"
subsegmentStartsWithSAP="1">
        <SegmentTemplate presentationTimeOffset="0" timescale="90000" duration="900000"
startNumber="1" media="chunk_ctvideo_cfm4s_rid$RepresentationID$_cn$Number$_mpd.m4s"
initialization="chunk_ctvideo_cfm4s_rid$RepresentationID$_cinit_mpd.m4s"/>
        <Representation id="p0a0r0" codecs="avc1.4d4020" width="1280" height="720" sar="1:1"
bandwidth="1500000" />
        <Representation id="p0a0r1" codecs="avc1.4d401f" width="640" height="360" sar="1:1"
bandwidth="900000" />
        <Representation id="p0a0r2" codecs="avc1.428015" width="284" height="160" sar="1:1"
bandwidth="600000" />
    </AdaptationSet>
    <AdaptationSet id="1" mimeType="audio/mp4" lang="eng" segmentAlignment="true"
startWithSAP="1" subsegmentAlignment="true" subsegmentStartsWithSAP="1">
        <Role schemeIdUri="urn:mpeg:dash:role:2011" value="main"/>
        <SegmentTemplate presentationTimeOffset="0" timescale="48000" duration="480000"
startNumber="1" media="chunk_ctaudio_cfm4s_rid$RepresentationID$_cn$Number$_mpd.m4s"
initialization="chunk_ctaudio_cfm4s_rid$RepresentationID$_cinit_mpd.m4s"/>
        <Representation id="p0a1r0" codecs="mp4a.40.2" audioSamplingRate="48000"
bandwidth="97000">
            <AudioChannelConfiguration
schemeIdUri="urn:mpeg:dash:23003:3:audio_channel_configuration:2011" value="2"/>
        </Representation>
    </AdaptationSet>
</Period>
</MPD>
```

FIG. 5A

```xml
<?xml version="1.0" encoding="UTF-8"?>
<MPD xmlns:xsi="http://www.w3.org/2001/XMLSchema-instance"
     xmlns="urn:mpeg:dash:schema:mpd:2011"
     xmlns:xlink="http://www.w3.org/1999/xlink"
     xsi:schemaLocation="urn:mpeg:DASH:schema:MPD:2011
http://standards.iso.org/ittf/PubliclyAvailableStandards/MPEG-DASH_schema_files/DASH-MPD.xsd"
     profiles="urn:mpeg:dash:profile:isoff-live:2011"
     type="dynamic"
     minimumUpdatePeriod="PT7.77S"
     publishTime="2016-06-15T01:47:34Z"
     availabilityStartTime="2016-06-14T12:29:57Z"
     timeShiftBufferDepth="PT52.0S"
     suggestedPresentationDelay="PT15.0S"
     minBufferTime="PT6.0S">
<ProgramInformation>
    <Title>live.smil</Title>
</ProgramInformation>
<Period id="0" start="PT0.0S">
    <AdaptationSet frameRate="15" id="0" maxHeight="720" maxWidth="1280" mimeType="video/mp4"
par="16:9" segmentAlignment="true" startWithSAP="1" subsegmentAlignment="true"
subsegmentStartsWithSAP="1">
        <SegmentTemplate duration="900000"
initialization="chunk_ctvideo_cfm4s_rid$RepresentationID$_cinit_mpd.m4s"
media="chunk_ctvideo_cfm4s_rid$RepresentationID$_cn$Number$_mpd.m4s" presentationTimeOffset="0"
startNumber="1" timescale="90000"/>
        <Representation bandwidth="1500000" codecs="avc1.4d4020" height="720" id="p0a0r0" sar="1:1"
width="1280">
<BaseURL>http://rlau-
omnicache:11080/omnicacheroute/http/192.168.54.111:1935/dash/smil:live.smil/</BaseURL>
</Representation>
        <Representation bandwidth="900000" codecs="avc1.4d401f" height="360" id="p0a0r1" sar="1:1"
width="640">
<BaseURL>http://rlau-
omnicache:11080/omnicacheroute/http/192.168.54.111:1935/dash/smil:live.smil/</BaseURL>
</Representation>
        <Representation bandwidth="600000" codecs="avc1.428015" height="160" id="p0a0r2" sar="1:1"
width="284">
<BaseURL>http://rlau-
omnicache:11080/omnicacheroute/http/192.168.54.111:1935/dash/smil:live.smil/</BaseURL>
</Representation>
    <BaseURL>http://rlau-
omnicache:11080/omnicacheroute/http/192.168.54.111:1935/dash/smil:live.smil/</BaseURL>
</AdaptationSet>
    <AdaptationSet id="1" lang="eng" mimeType="audio/mp4" segmentAlignment="true" startWithSAP="1"
subsegmentAlignment="true" subsegmentStartsWithSAP="1">
        <Role schemeIdUri="urn:mpeg:dash:role:2011" value="main"/>
        <SegmentTemplate duration="480000"
initialization="chunk_ctaudio_cfm4s_rid$RepresentationID$_cinit_mpd.m4s"
media="chunk_ctaudio_cfm4s_rid$RepresentationID$_cn$Number$_mpd.m4s" presentationTimeOffset="0"
startNumber="1" timescale="48000"/>
        <Representation audioSamplingRate="48000" bandwidth="97000" codecs="mp4a.40.2" id="p0a1r0">
            <AudioChannelConfiguration
schemeIdUri="urn:mpeg:dash:23003:3:audio_channel_configuration:2011" value="2"/>
        <BaseURL>http://rlau-
omnicache:11080/omnicacheroute/http/192.168.54.111:1935/dash/smil:live.smil/</BaseURL>
</Representation>
    <BaseURL>http://rlau-
omnicache:11080/omnicacheroute/http/192.168.54.111:1935/dash/smil:live.smil/</BaseURL>
</AdaptationSet>
<BaseURL>http://rlau-
omnicache:11080/omnicacheroute/http/192.168.54.111:1935/dash/smil:live.smil/</BaseURL>
</Period>
<Location>http://rlau-
omnicache:11080/omnicacheroute/http/192.168.54.111:1935/dash/smil:live.smil/manifest_mpm4sav_mvnumber.m
pd</Location>
<BaseURL>http://rlau-
omnicache:11080/omnicacheroute/http/192.168.54.111:1935/dash/smil:live.smil/</BaseURL>
</MPD>
```

FIG. 5B

CHUNKED HTTP VIDEO CACHE ROUTING

BACKGROUND OF THE INVENTION

The invention generally relates computer systems and computer executed methods, and more specifically to chunked Hypertext Transfer Protocol (HTTP) video cache routing.

In general, large amounts of Internet streaming video traffic are being delivered using HTTP to leverage the existing web infrastructure. A video may be divided into many files (called "chunks"), each containing only a few seconds of video at one extreme, or stored in a single "unchunked" file at the other.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus, including computer program products, for chunked Hypertext Transfer Protocol (HTTP) video cache routing.

In general, in one aspect, the invention features a method including, in a client system linked to at least one arbitrary cache node and a group of interconnected computers that include one or more local cache nodes, the client system including at least a processor and a memory, the memory including a browser, loading a player in the browser, and on the player, playing chunked HTTP video requested from the one arbitrary cache node acting as a master cache node, the master cache node requesting a manifest and modifying the manifest so the requests for the actual video are retrieved by the client system from one of the local cache nodes.

In general, in another aspect, the invention features a method including loading a video player into a browser, the browser running in a memory of a user system, loading, in the video player, a URI of a chunked HTTP video, consulting, in the browser, a PAC file, seeing that the URI matches a domain serving video, and making a request to a master cache node as specified by the PAC file, loading, in the browser, MPD from the master cache node, loading, in the master cache node, MPD from the Internet, modifying, in the master cache node, the manifest to point to the appropriate local cache node depending on the browser's IP address, and returning it to the player in the browser, and parsing, in the player, the manifest and making subsequent requests for media chunks to the re-written URIs, which now point to a local cache node acting as a reverse proxy.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The invention will be more fully understood by reference to the detailed description, in conjunction with the following figures, wherein:

FIG. 2 is a block diagram.

FIG. 3A is an exemplary HLS file.

FIG. 3B is an exemplary modified HLS file.

FIG. 4A is an exemplary HDS file.

FIG. 4B is an exemplary modified HDS file.

FIG. 5A is a listing of exemplary DASH MPD code.

FIG. 5B is a listing of modified DASH MPD code of FIG. 5A.

DETAILED DESCRIPTION

Figure 1:
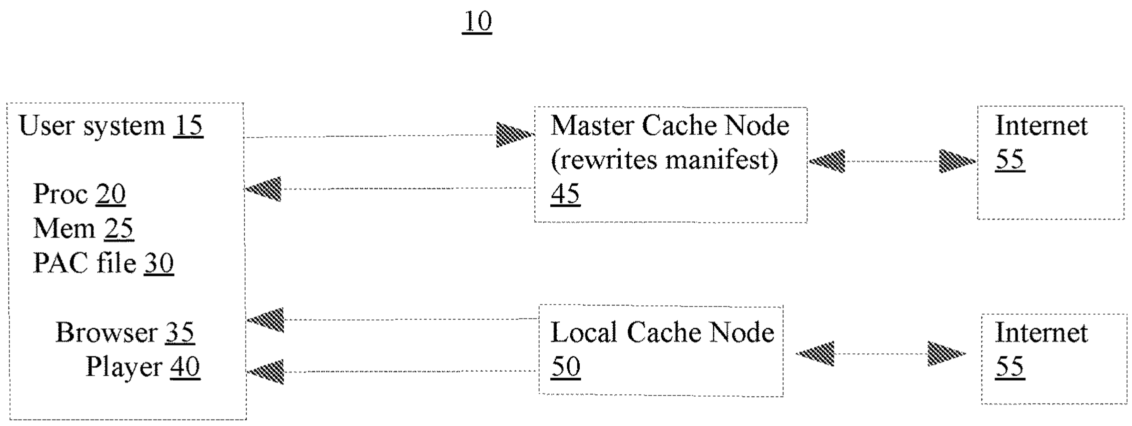
FIG. 1 is a block diagram.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

In general, video is digitized and encoded with a codec, such as H.264 or MPEG-4 Part 10, for example. Advanced Video Coding (MPEG-4 AVC) is a block-oriented motion-compensation-based video compression standard that is currently one of the most commonly used formats for the recording, compression, and distribution of video content. The encoded video is packaged into a container format, such as, for example, MPEG-4 (MP4) or Apple® QuickTime Movie (MOV). Finally, a wire protocol is used to transmit the video over the Internet.

In general, a "wire protocol" is a mechanism for transmitting data from point A to point B in a network. A wire protocol defines conversational byte sequences that pass over a network to make things happen.

In general, wire protocols span the spectrum from true streaming on one extreme to file download at the other extreme. In a full streaming protocol, such as Real Time Messaging Protocol (RTMP) or Real Time Streaming Protocol (RTSP), for example, a sender and a receiver are continuously connected with data sent as a continuous stream, such as, for example, one frame at a time. At the other extreme are file-based protocols such as Hypertext Transfer Protocol (HTTP) and Hypertext Transfer Protocol Secure (HTTPS) progressive download. Here, a video asset is treated as an entire file and a protocol suitable for file transfers such as HTTP is used.

One disadvantage of a file based protocol for live video is that it cannot be easily used for live video because live video cannot be contained within a file as new data are constantly added to the end. Thus, file-based protocols are primarily limited to video on demand. A full streaming protocol works well for live streaming, however it has disadvantages. Some of the disadvantages are that video-specific support is required to cache and accelerate delivery on the Internet and that seeking backwards (e.g., live DVR functionality) requires great protocol complexity and again, specific support along the various transmission hops on the Internet for cached/accelerated delivery.

A third class of protocols is referred to as "chunked HTTP" (also known as adaptive HTTP streaming protocols or HTTP pseudo-streaming protocols). Here, the video stream is divided into "chunks" of a small duration, e.g., 1 to 10 seconds. Each chunk is then treated as a normal file and delivered via HTTP. Note that when we reference HTTP in this specification we also intend to include the HTTPS variant.

Chunked HTTP takes better advantage of widely deployed Internet infrastructures, such as content delivery networks (CDNs), such as Akamai® and Amazon® CloudFront and within the enterprise HTTP proxy caches, all of which know how to handle HTTP file delivery well. Chunked HTTP also has better compatibility with mobile devices (e.g., smartphones and tablets), where higher latencies make it more difficult to support full streaming. In addition, chunked HTTP has an ability to support different (adaptive) bit rates to different users and an ability to easily support digital video recorder (DVR) seek functionality, as that is simply skipping to load and starting from a different chunk.

One primary disadvantage of a chunked HTTP protocol is that there is increased latency as two or three chunks (or more for higher latency connections) need to be buffered to insure a smooth viewer experience. This makes chunked HTTP protocols unsuitable for real-time interactions such as video conferencing, but does not materially detract from there use for one directional live video delivery.

Thus, chunked HTTP video protocols like HTTP Live Streaming (HLS) from Apple, Inc., Microsoft® Smooth Streaming, Adobe® HDS, and MPEG Dynamic Adaptive Streaming over HTTP (DASH) have become dominant compared to full streaming protocols like RTMP and RTSP, which have become relegated to special use cases such as real-time streams and camera encoding, for example.

Video consumes large amounts of bandwidth. A typical H.264 compressed HD quality video, as of this writing, consumes 2 to 4 Mb/second. Various strategies can be used to mitigate the impact of the high bandwidth consumption. As mentioned earlier, chunked HTTP protocols will work with HTTP caches. For secure HTTPS delivery, decryption by the cache is required.

HTTP proxy caching comes in two configurations, i.e., standard "forward" proxy caching and "reverse" proxy caching. When using a forward proxy configuration, caching proxy machines are located between the client and the Internet. The browser software is configured to communicate with the proxy in retrieving Web content. This configuration can apply to all requests, or selectively to some requests. The proxy may have the content already cached, or may forward a client's request to content hosts located across the Internet, caches the retrieved data, and delivers the retrieved data to the client. In a forward proxy scenario, the URLs loaded are normal looking, e.g., http://www.google.com, and the configuration to use the forward proxy is made in the browser (or in an operating system-wide configuration consulted by the browser).

By contrast, when using a reverse proxy configuration, the URLs refer to the cache itself, e.g. http://mycache.abccompany.com/www.google.com. The reverse proxy plays the role of the content host, but the URL construction contains enough information, perhaps in combination with configuration details, to inform the reverse proxy from where to obtain the underlying content. Retrieving and caching the content proceeds similarly as to a forward proxy. Thus a reverse proxy does not require browser configuration, but requires changing the URLs to point to the reverse proxy. Conversely a forward proxy has the complementary set of advantage/disadvantage.

In the case of forward proxy supporting HTTPS, a "man-in-the-middle" approach whereby the forward proxy presents a "fake" HTTPS certificate corresponding to a third party web site may be required to permit decryption. As the forward proxy lives within the enterprise, the enterprise can designate the "fake" certificate as trusted, permitting the decryption.

A typical enterprise wishing to deploy caching needs to decide where to place the caches and also how to direct user traffic to the appropriate cache. In a forward proxy, the direction takes one of several forms (or a hybrid combination of these several forms): A proxy-auto configuration (PAC) file with rules with the location of the PAC configured per user, a variant where the location of PAC is provided via an auto-configured by DHCP, a single cache configuration statically configured or explicit client logic (e.g. to specify a different URI depending on location). An example PAC file follows:

TABLE 1

```
function FindProxyForURL(url, host) {

// If the hostname matches, send direct.
    if (dnsDomainIs(host, "intranet.domain.com") ||
        shExpMatch (host, "(*.abcdomain.com|abcdomain.com)"))
        return "DIRECT";

// If the protocol or URL matches, send direct.
    if (url.substring(0, 4)=="ftp:" ||
        shExpMatch (url, "http://abcdoinain.com/folder/*"))
        return "DIRECT";

// If the requested website is hosted within the internal network,
send direct.
    if (isPlainHostName(host) ||
        shExpMatch(host, "*.local") ||
        isInNet (dnsResolve(host), "10.0.0.0", "255.0.0.0") ||
        isInNet (dnsResolve(host), "172.16.0.0", "255.240.0.0") ||
        isInNet (dnsResolve(host), "192.168.0.0", "255.255.0.0") ||
```

TABLE 1-continued

```
19          isInNet (dnsResolve(host), "127.0.0.0", "255.255.255.0"))
20          return "DIRECT";
21
22    // If the IP address of the local machine is within a defined
23    // subnet, send to a specific proxy.
24        if (isInNet (myIpAddress( ). "10.10.5.0", "255.255.255.0"))
25            return "PROXY 1.2.3.4:8080";
26
27    // DEFAULT RULE: All other traffic, use below proxies, in fail-over
28    order.
29        return "PROXY 4.5.6.7:8080; PROXY 7.8.9.10:8080";
30
    }
```

In the PAC file case, rules referencing the myIpAddress( ) function can be used to specialize the redirection depending on the client's IP address. Alternatively, Domain Name Server (DNS) names that resolved differently depending on location can be used in all cases. This is sometimes known as geo-DNS or subnet-specific DNS. Similarly, "Anycast IP" functionality can be used to direct traffic for an IP address to different actual servers depending on location. ("Anycast IP" is the use of BGP4 announcements announcing the same IP address from different routers, causing the shortest path router to win.) There are also specialized network routing and acceleration hardware devices that can provide Anycast-like functionality without requiring BGP4. In a reverse proxy use case, there is no PAC capability, but DNS or Anycast and explicit client logic can be used.

All of the above approaches have drawbacks as more cache nodes are added. Large PAC files present performance challenges (moreover, maintenance of PAC files tend to be decentralized, making their update difficult). DNS is typically managed by a different group than those concerned with video delivery. Many companies also lack infrastructure to handle geography specific DNS internally. Anycast IP requires a high level of network routing expertise or the use of expensive devices. Moreover, it does not work well due to route-flapping where there is a dense deployment of cache nodes, exactly the use case desired for maximum cache performance. However, when the number of cache nodes is low (i.e. the cache nodes are sparse), any of these approaches are much easier to manage—at the expense of having lower cache performance because there are fewer caches.

As shown in FIG. 1, an exemplary network 10 includes a user system 15. The user system 15 includes at least a processor 20 and memory 25. Memory 25 includes a proxy-auto configuration (PAC) file 30 and a browser 35, such as Firefox®, Chrome®, Opera® or Explorer®. The browser 35 loads a media player 40.

The user system 15 is shown to be in communication with a master cache node 45 and a local cache node 50. Both the master cache node 45 and the local cache node 50 are in communication with the Internet 55. Each of the nodes may be implemented as a computer systems including at least a processor and a memory.

One common aspect of chunked HTTP video protocols is that there is typically some type of manifest file (e.g., the ".m3u8" file for HLS, the ".mpd" for DASH, the ".f4m" for HDS, and so forth) that in turn refers to other assets. In the present invention, we deploy a small number of cache nodes, known as "master" cache nodes, such as master cache node 45. Only the master cache nodes need to have traffic sent to them (e.g. by PAC, DNS, and/or Anycast IP). For example, there may be just one master cache 45, as illustrated in FIG. 1, or one per large geographic region. Because of the small number, many of the implementation and management challenges are mitigated.

The master cache nodes, upon receiving a request for a manifest, analyze the source of the request (e.g., the client's IP address), and then decide which of a set of "local" cache nodes, such as local cache node 50, would be most appropriate. Before the master cache node 45 serves the manifest, it will alter the contents of the manifest such that requests for actual audio/video content go to the local cache node 50 instead. Each local cache node then functions as a reverse proxy serving the actual audio/video data. It should be noted that a master cache node can also serve as a local cache node.

Different chunked HTTP protocols provide for different means of making such alterations. In DASH, <BaseURL>s can be altered or added in the MPD. (Though in the event that absolute URLs are used in the unmodified MPD, those would need to be rewritten. Typically only relative URLs are used but in combination with an explicit or implicit base URL. An implicit base URL would typically be the parent directory of the MPD URL itself.) Other protocols may support similar "base URL" functionality whereby relative URLs are derived—this is a very commonly used Internet URI technique, e.g., RFC 1808. or, in the case of dynamic (live) MPDs, a <Location> element can also be inserted. Note that URI and URL are used interchangeably in this description. Some standards refer to URL and others to URI. We intend URI and URL to mean the full functionality of both.

HDS supports a <baseURL> tag in the .f4m file. Modification is typically as simple as inserting a <baseURL>. The same comments about absolute URLs as in the MPD case also applies analogously here.

The most complex case is HLS. In HLS the master playlist (see example in section 8.4 of https://tools.ietf.org/html/draft-pantos-http-live-streaming-19) provides the URLs to the individual media playlists and can be modified. The segment URLs in the media playlist can also be modified. Modifying the media playlist is less desirable for live content as the media playlist needs to be reloaded constantly, but in the cases where the media playlist contains absolute URLs or where there is no master playlist, modification of segment URLs will be required unless all the segment URLs have a common base, in which case, an alternative media playlist/master playlist can be synthesized by the proxy. E.g. if all the media segments have URLs like http://abcxyz.com/1.ts, http://abcxyz.com/2.ts, http://abcxyz.com/3.ts, it is possible to synthesize a new playlist with a url of http://myproxy.com/abcxyz.com/playlist.m3u8 and have the reverse proxy synthesize playlist.m3u8 as simply 1.ts, 2.ts, 3.ts. The case of synthesizing a master playlist where none is available is also straightforward, for the master playlist simply needs to refer to a media playlist at the reverse proxy.

Though we are mostly concerned about optimizing cache routing, this same rewriting mechanism can be used to turn off sending traffic to cache nodes. For example, a manifest can be rewritten with the URL of the direct (uncached) source. This may be useful, for example, in cases such as when there is an outage of local cache nodes serving a particular network segment.

Some protocols permit the specification of multiple base URLs for failover and/or load distribution purposes. We can optionally use such mechanisms to refer to multiple local cache nodes, or even include an un-cached reference as a failover.

Because manifests require relatively little bandwidth in comparison to the actual audio/video data, the expense of a client needing to interact with a master cache node initially is relatively low as the much higher bandwidth audio/video data are served more efficiently by the local cache nodes. Thus, this arrangement optimizes the tradeoff between ease of implementation and performance.

As the manifest manipulation is done within the video cache nodes, their control and management can stay within the groups responsible for video caching, reducing cross-organizational dependence on other groups, e.g. the group that maintains DNS.

In one implementation, the master cache nodes are provided with a list of which client IP addresses should "map" to which local cache nodes. For example, this map may be based on CIDR (either IPv4 or IPv6) specifications that are provided as rules. As used herein, we refer to the process of determining the set of local cache nodes based on the client IP address as "mapping."

Alternatively, the video caching infrastructure can collect information about local node cache availability and performance. This can be done by communications between the master node and the local nodes (e.g., via the local nodes checking in with the master node, or the master node querying each local node). One example implementation is to collect an inventory of local nodes and map a client based on the local node in inventory with the most restrictive (that is, the one with the smallest range of IPs) CIDR that includes the IP of the client. This inventory can be periodically refreshed to discover new local nodes and to mark offline local nodes that are no longer available.

In one implementation, every node is provided with a list of master nodes. Periodically, each node contacts its listed master nodes and announce which CIDRs are served.

In another variation, any node is capable of being either a master node or a local node. Each node is given a set of direct peer nodes which will be contacted. Instead of merely announcing CIDR information, the entire CIDR table will be exchanged in both directions. Either the full table or only changes can be exchanged depending implementation. In this manner, the full table propagates to the entire mesh of nodes. As long as there is some path between two nodes, the two nodes will participate in the same mesh. These examples of how to exchange CIDR information have close analogues to how routers exchange routing tables, e.g. a periodic full exchange of tables is similar to the old Cisco RIP (Routing Information Protocol). This is to be expected as the nature of the information exchanged is similar with the exception that our use case does not require distance information. Thus, the accumulated experience from working with various routing table propagation protocols can be adapted to inform our solution as well.

Though any node can be master or local, it is usually the case that for implementation ease, the browser or video application configuration will treat only some nodes as master. Nevertheless, the advantage of a full mesh is that the actual designation of master nodes in the browser (e.g. PAC)/video application can be divorced from the configuration of the cache nodes, removing the need to keep the two in sync.

A given enterprise can have one common set of masters referring to one common set of local nodes. Alternatively, one large mesh can be used. But multiple disjoint sets/meshes can also be deployed. The more optimized topology selection will depend on the topology of the enterprise's network and also on non-performance related requirements such as legal or security requirements to separate data in certain jurisdictions or business units.

A local node can explicitly announce it is going out of service, or alternatively, ca be monitor by other nodes either by monitor requests or my inference from the lack of check-in as lack of availability.

Of course, performance information can also be collected between local nodes and clients, e.g., the video player 45 can report bit rate information, error rate information, and so forth.

The information can also be empirically gathered by observing which of several adaptive bit rates (ABR) is selected by clients in a given subnet from a given local cache node, or by sending test messages like ICMP pings and measuring response times. Several candidate local cache nodes for a given user IP can be sampled over different users within the same IP CIDR—then higher performance can be inferred by those local nodes that see more requests for higher bit rates or have better ping times) These data can then be used to automate and/or optimize the master cache node's selection of a local node for any given request. Finally, information from third party network monitoring and performance tools can be used as well.

FIG. 2 is a flow chart of an example process 100 for providing chunked Hypertext Transfer Protocol (HTTP) video cache routing. As shown in FIG. 2, process 100 may include loading a video player into a browser (block 110). The browser is running in the memory 25 of the user system 15. In implementations, the user system 15 may be, for example, a laptop computer, desktop computer, a tablet computer, a smartphone, and so forth.

As further shown in FIG. 2, process 100 may include the video player loading a URI of a chunked HTTP video (block 120). The URI of the chunked HTTP video is a manifest, such as a DASH MPD.

As further shown in FIG. 2, process 100 may include the browser consulting a PAC file, seeing that the URI matches a domain serving video, and makes a request to a master cache node as specified by the PAC file (block 130).

As further shown in FIG. 2, process 100 may include the browser loading a Media Presentation Description (MPD) from the master cache node (block 140).

As further shown in FIG. 2, process 100 may include the master cache node loading a MPD from the Internet (or from another local cache node) (block 150).

As further shown in FIG. 2, process 100 may include the master cache node re-writing the manifest to point to the appropriate local cache node depending on the browser's IP address, and returns to the player in the browser (block 160).

As further shown in FIG. 2, process 100 may include the player parsing the manifest and making subsequent requests for media chunks to the re-written URIs, which now point to a local cache node acting as a reverse proxy (block 170).

Although FIG. 2 shows example blocks of process 100, in some implementations, process 100 may include additional blocks, fewer blocks, different blocks, or differently arranged blocks than those depicted in FIG. 2. Additionally, or alternatively, two or more of the blocks of process 100 may be performed in parallel.

By way of example, FIG. 3A illustrates an exemplary HLS file and FIG. 3B illustrates an HLS file of FIG. 3B modified to route to rlau-omnicache.

By way of example, FIG. 4A illustrates an HDS file and FIG. 4B illustrates an HDS file of FIG. 4A modified to route to rlau-omnicache.

By way of example, FIG. 5A illustrates a DASH MPD prior to modification and FIG. 5B illustrates a modification of the DASH MPD of FIG. 5A.

The foregoing description of the preferred embodiments of the invention is by way of example only, and other variations of the above-described embodiments and methods are provided by the present invention. Components of this invention may be implemented using a programmed general-purpose digital computer, using application specific integrated circuits, or using a network of interconnected conventional components and circuits. The embodiments described herein have been presented for purposes of illustration and are not intended to be exhaustive or limiting. Many variations and modifications are possible in light of the foregoing teaching. The invention is limited only by the following claims.

What is claimed is:

1. A method comprising:

in a client system linked to at least one arbitrary cache node and a group of interconnected computers that include one or more local cache nodes, the client system including at least a processor and a memory, the memory including a browser, loading a player in the browser; and on the player, playing chunked HTTP video requested from the one arbitrary cache node acting as a master cache node, the master cache node requesting a chunked HTTP video manifest and returning a modified version of the manifest that references multimedia content on the local cache nodes, the player loading one or more subsequent chunked HTTP video requests from the local cache nodes by parsing and obeying the modified manifest, the request for the manifest directed by a PAC file to the master cache node, the request for the manifest using reverse proxying.

2. The method of claim 1 wherein the request for the manifest uses HTTPS and is encrypted by a man-in-the-middle technique.

3. The method of claim 1 wherein requests for the manifest uses to one of the local cache nodes use reverse proxying.

4. The method of claim 1 wherein a chunked HTTP protocol is MPEG DASH.

5. The method of claim 1 wherein a chunked HTTP protocol is HLS.

6. The method of claim 1 wherein a chunked HTTP protocol is Smooth Streaming.

7. The method of claim 1 wherein a chunked HTTP protocol is HDS.

8. The method of claim 1 wherein the modification to the manifest involves changing URIs to absolute URIs referencing the one of the local cache nodes.

9. The method of claim 1 wherein the modification to the manifest involves changing or inserting one or more base URL constructs where at least one of them references the one of the local cache nodes.

10. The method of claim 1 wherein a mapping uses a CIDR-based rules specification.

11. The method of claim 1 wherein a mapping involves matching of a user/client's IP to a known inventory of candidate local cache nodes.

12. The method of claim 1 wherein an inventory of candidate local cache nodes for mapping is derived using communications between a subset of cache nodes.

13. The method of claim 1 wherein a mapping uses performance information provided by clients.

14. The method of claim 1 wherein a mapping uses implicit performance information provided by adaptive bit rate selection by the client.

15. The method of claim 1 wherein a mapping uses information from outside sources of network availability and performance information.

16. A method comprising:

loading a video player into a browser, the browser running in a memory of a user system;

loading, in the video player, a URI of a chunked HTTP video;

consulting, in the browser, a PAC file, seeing that the URI matches a domain serving video, and making a request to a master cache node as specified by the PAC file;

loading, in the browser, a Media Presentation Description (MPD) from the master cache node;

loading, in the master cache node, a MPD from the Internet;

modifying, in the master cache node, the manifest to point to the appropriate local cache node depending on the browser's IP address, and returning it to the player in the browser; and parsing, in the player, the manifest and making subsequent requests for media chunks to the re-written URIs, which now point to a local cache node acting as a reverse proxy.

* * * * *